United States Patent
McPherson et al.

(10) Patent No.: US 7,629,013 B2
(45) Date of Patent: Dec. 8, 2009

(54) PARTIAL FAT REPLACEMENT IN FLAT BREAD

(75) Inventors: Andrew E. McPherson, Mt. Prospect, IL (US); Laura Brisske, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 629 days.

(21) Appl. No.: 11/252,100

(22) Filed: Oct. 17, 2005

(65) Prior Publication Data

US 2007/0087102 A1 Apr. 19, 2007

(51) Int. Cl.
*A21D 13/00* (2006.01)

(52) U.S. Cl. .................. 426/549; 426/496; 426/653

(58) Field of Classification Search .......... None
See application file for complete search history.

(56) References Cited

U.S. PATENT DOCUMENTS

| | | | |
|---|---|---|---|
| 3,767,421 A * | 10/1973 | Gulstad et al. | 426/532 |
| 4,510,166 A | 4/1985 | Lenchin et al. | |
| 4,587,131 A | 5/1986 | Bodor et al. | |
| 5,445,678 A | 8/1995 | Whistler | |
| 5,470,391 A | 11/1995 | Mallee et al. | |
| 5,482,560 A | 1/1996 | Ammeraal et al. | |
| 5,547,513 A | 8/1996 | Mallee et al. | |
| 5,571,334 A | 11/1996 | Dunn et al. | |
| 5,576,036 A * | 11/1996 | Pesheck et al. | 426/94 |
| 5,580,390 A | 12/1996 | Whistler | |
| 5,584,937 A | 12/1996 | Finocchiaro | |
| 5,614,243 A | 3/1997 | Dunn et al. | |
| 5,651,828 A | 7/1997 | Whistler | |
| 5,753,296 A | 5/1998 | Girsh | |
| 5,882,713 A | 3/1999 | Eskins et al. | |
| 6,365,210 B1 * | 4/2002 | Schaible et al. | 426/94 |
| 6,399,120 B1 * | 6/2002 | Kambe et al. | 426/27 |
| 6,627,242 B1 * | 9/2003 | McPherson et al. | 426/549 |
| 2001/0007690 A1 | 7/2001 | Girsh | |
| 2002/0170092 A1 | 11/2002 | Turk | |

FOREIGN PATENT DOCUMENTS

| | | |
|---|---|---|
| EP | 0528902 B1 | 8/1994 |
| EP | 0804884 A2 | 11/1997 |
| EP | 0516107 B2 | 12/1999 |
| EP | 0723403 B1 | 8/2000 |
| EP | 0758198 B1 | 9/2003 |
| EP | 1155081 B1 | 2/2004 |
| WO | WO 92/21703 | 12/1992 |
| WO | WO 95/10196 | 4/1995 |
| WO | WO 95/27003 | 10/1995 |
| WO | WO 95/27004 | 10/1995 |
| WO | WO 96/10586 | 4/1996 |
| WO | WO 97/26296 | 7/1997 |
| WO | WO 97/29186 | 8/1997 |
| WO | WO 00/23517 | 4/2000 |
| WO | WO 02/091844 A1 | 11/2002 |

* cited by examiner

*Primary Examiner*—Lien Tran
(74) *Attorney, Agent, or Firm*—Fitch, Even, Tabin & Flannery

(57) ABSTRACT

This invention provides a reduced-fat flat bread. More specifically, the present invention relates to a reduced-fat flat bread, wherein a reduction of trans-fat containing hard fat chips is accomplished by partial replacement with starch-based particulate fat mimetics. In one embodiment, a reduced-fat flat bread is prepared from a dough comprising, in baker's percentages, about 100% flour, about 0.5% to about 15% sugar, about 5% to about 10% cornmeal, about 0.5% to about 4% salt, about 50% to about 65% water, about 2% to about 10% soybean oil, about 0% to about 2% hard fat chips, an effective amount of a starch-based particulate fat mimetic to reduce the hard fat content of the reduced-fat flat bread by at least about 25%, about 0.5% to about 4% compressed yeast, an effective amount of a texturizing agent to provide tenderness to the crumb grain and crispiness to the surface of the reduced-fat flat bread, about 0.1% to about 0.8% of a flavoring agent, and about 0.2% to about 0.3% of a release agent, wherein the starch-based particulate fat mimetic has an average particle size of less than about 800 microns.

18 Claims, No Drawings

PARTIAL FAT REPLACEMENT IN FLAT BREAD

FIELD OF THE INVENTION

This invention provides a reduced-fat flat bread or pizza crust. More particularly, flat bread having a reduced level of hard fat as compared to conventional flat breads is obtained by partial replacement of the hard fat chips with starch-based particulate fat mimetics.

BACKGROUND OF THE INVENTION

There is an increased awareness that high intake of fat may be a factor in the development of obesity and cardiovascular disease. Specifically, saturated fat and trans-fat may raise low-density lipoprotein (LDL), which may increase the risk of coronary heart disease. Coronary heart disease is one of the leading causes of death in the United States. Moreover, the United States Food and Drug Administration has required that trans-fat be listed on food labels starting on Jan. 1, 2006. Accordingly, there is an increasing demand for food products with reduced hard fats, trans-fats, saturated fats, and/or calories.

Flat breads and, in particular pizza crusts, contain trans-fat containing hard fat chips, which impart positive textural attributes to the finished products in terms of appearance and organoleptic properties. One of the functions of the hard fat chips in a pizza crust is to impart the textural attribute of a "pocket" in the crust as the crust rises. Upon baking, the fat melts and deposits at the bottom of the pocket and/or melts into the crumb grain. Given the popularity of pizza in the United States, there is a demand for a reduced-fat flat bread or pizza crust that maintains the positive textural attributes of the full-fat counterparts at reduced levels of the hard fat and trans-fat components.

The food industry has devoted years of research and development to fat replacement in food products. The use of starch as a fat-replacer is well known. For example, European Patent 0 516 107 (Sep. 20, 1995) relates to the sole use of a non-chemically modified cold-swelling, granular starch, which is obtainable by pre-gelatinization of the starch granules, as a fat and oil substitute in fat-reduced, cold-produced foodstuff emulsions like mayonnaise, salad dressing, and dips.

European Patent Specification 0 528 902 (published on Aug. 17, 1994) teaches a dough or batter composition for use in making fat-reduced non-bread bakery products wherein fat is replaced by a vegetable ingredient comprising dietary fiber and digestible starch.

European Patent Application 0 804 884 (published on Nov. 11, 1997) discloses a process for preparing foods using granular gelatinized starch produced by high-pressure treatment. The process of fat replacement disclosed is suitable for foods with a creamy consistency (e.g., low-fat emulsions like spreads, dressings, mayonnaise, and dips).

U.S. Pat. No. 4,510,166 (Apr. 9, 1985) provides converted starches, which with water form gels, suitable for use as a fat-and/or oil-replacements in foodstuffs such as ice cream, mayonnaise, buttermilk, salad dressing, margarine, whipped topping, and butter cream.

U.S. Pat. No. 5,547,513 (Aug. 20, 1996) provides a texturizing agent with fat-like attributes that can be used in full fat foods as a stabilizer. The disclosed foods suitable for containing the texturizing agent include mayonnaise, salad dressings, yogurt, cottage cheese, processed cheese, sour cream, edible spreads, cream cheese, peanut butter, frosting, meat products, cheesecake, mousse, and sauces.

There remains a need for a reduced-fat bread product, particularly a reduced-fat flat bread or pizza crust. While the use of starch as a fat-replacer is known in the art, these previous methods and compositions only teach the use of starch as a fat-replacer in fat-based emulsions and foods with a creamy consistency. The use of starch as a fat-replacer, and even more particularly the use of a starch-based particulate fat mimetic has not been disclosed for use with yeast leavened products. Generally, yeast leavened products such as breads are relatively low fat so fat replacement was not needed. However, the trans-fat content of flat bread and pizza crust is relatively high. Therefore, there is a need for a reduced-fat flat bread or pizza crust.

SUMMARY OF THE INVENTION

The present invention provides a reduced-fat flat bread or pizza crust. More specifically, the present invention relates to a reduced-fat flat bread or pizza crust, wherein a reduction of trans-fat containing hard fat chips is accomplished by partial replacement with starch-based particulate fat mimetics. The preferred starch-based particulate fat mimetics are tapioca pearls.

In one embodiment, a reduced-fat flat bread is prepared from a dough. The dough comprises, in baker's percentages, about 100% flour, about 0.5% to about 15% sugar, about 5% to about 10% cornmeal, about 0.5% to about 4% salt, about 50% to about 65% water, about 2% to about 10% soybean oil, about 0% to about 2% hard fat chips, an effective amount of a starch-based particulate fat mimetic to reduce the hard fat of the reduced-fat flat bread by at least about 25%, about 0.5% to about 4% compressed yeast, an effective amount of a texturizing agent to provide tenderness to the crumb grain and crispiness to the surface of the reduced-fat flat bread, about 0.1% to about 0.8% of a flavoring agent, and about 0.2% to about 0.3% of a release agent, wherein the starch-based particulate fat mimetic has an average particle size of less than about 800 microns. For purposes of this invention, reduction in hard fat, trans fat, and/or caloric content from hard fat is relative to a similar flat bread product prepared without replacement of the hard fat chips with the starch-based particulate fat mimetic. For comparative purposes, conventional flat bread dough would normally contain, in baker's percentages, about 2.5% to about 4% hard fat.

In another embodiment, the dough comprises, in baker's percentages, about 100% flour, about 0.5% to about 15% sugar, about 5% to about 10% cornmeal, about 0.5% to about 4% salt, about 50% to about 65% water, about 2% to about 10% soybean oil, about 0% to about 2% hard fat chips, an effective amount of starch-based particulate fat mimetic to reduce the hard fat content of the reduced-fat flat bread by at least about 25%, about 0.5% to about 4% compressed yeast, an effective amount of a texturizing agent to provide tenderness to the crumb grain and crispiness to the surface of the reduced-fat flat bread, about 0.1% to about 0.8% of a flavoring agent, and about 0.2% to about 0.3% of a release agent, wherein the starch-based particulate fat mimetic has an average particle size of about 800 microns to about 2000 microns and wherein the starch-based particulate fat mimetic has a gelatinization temperature of about 60° C. to about 80° C.

DETAILED DESCRIPTION OF THE PREFERRED EMBODIMENTS

The present invention provides a reduced-fat flat bread. The term "flat bread" as used herein, is defined as any yeast leaven product generally having a relatively flat shape. Such flat breads include, but are not limited to, pizza crust, chapati, hearth-breads, and the like. The preferred flat bread of this invention is pizza crust. More specifically, the present invention relates to reduced-fat flat bread, wherein a reduction of trans-fat containing hard fat chips is accomplished by partial replacement with starch-based particulate fat mimetics. The term "starch-based particulate fat-mimetic" as used herein, is defined as agglomerates and/or aggregates of uncooked and partially gelatinized starch granules having an average particle size less than about 2000 microns.

It should first be noted that the percentages used in the present specification to describe the reduced-fat flat bread dough are generally in baker's percentages, which are weight percentages based on the weight of flour used in a specific recipe (generally per 100 pounds of flour). For example, for 100 pounds of flour in a recipe, 57% water and 1.5% salt would mean the addition of 57 pounds of water and 1.5 pounds of salt, respectively, to 100 pounds of flour. Of course, such baker's percentages do not normally add up to 100%. Conventional percentages can be calculated from baker's percentages by normalizing to 100%.

This invention relates to reduced-fat flat bread prepared from a dough, said dough comprising, in baker's percentages, about 100% flour, about 0.5% to about 15% sugar (preferably about 0.5% to about 10%), about 5% to about 10% cornmeal (preferably about 5% to about 10%), about 0.5% to about 4% salt (preferably about 1% to about 3%), about 50% to about 65% water (preferably about 55% to about 60%), about 2% to about 10% soybean oil (preferably about 4% to about 6%), about 0% to about 2% hard fat chips (preferably about 1% to about 2%), an effective amount of a starch-based particulate fat mimetic to reduce the hard fat content of the reduced-fat flat bread by at least about 25%, about 0.5% to about 4% compressed yeast (preferably about 1.5% to about 3%), an effective amount of a texturizing agent to provide tenderness to the crumb grain and crispiness to the surface of the reduced-fat flat bread, about 0.1% to about 0.8% of a flavoring agent (preferably about 0.5% to about 0.7%), and about 0.2% to about 0.3% of a release agent (preferably about a 0.22% to about 0.28%), wherein the starch-based particulate fat mimetic has an average particle size of less than about 800 microns.

Preferably, the starch-based particulate fat mimetic is selected from the group consisting of starch pearls, starch particulates, starch agglomerates, and the like, obtained from a starch source selected from the group consisting of tapioca starch, normal corn starch, potato starch, and the like, and combinations thereof. Even more preferably, the starch-based particulate fat mimetic is described as a tapioca pearl. Tapioca pearls are dense agglomerates of uncooked and partially gelatinized tapioca starch granules that are made by stirring or rolling damp starch in a container to the desired particle size and dried. See, e.g., Moore et al., *Applications of Starch in Foods*, STARCH CHEMISTRY (2d ed. 1984). Tapioca pearls are practically devoid of lipid, thus, there should be no appreciable amount of starch lipid complex.

In addition to tapioca pearls, other starch-based particulate fat mimetics having the same average particle size range and the same gelatinization temperature range may be used in the present invention. The average particle size of the starch-based particulate fat mimetic is preferably about 600 microns to about 2000 microns, and more preferably about 700 microns to about 900 microns. The starch-based particulate fat mimetic preferably has a gelatinization temperature of about 60° C. to about 80° C. and more preferably about 65° C. to about 75° C.

Hard fat chips, although reduced in amount relative to conventional flat breads, are present in the present pizza crust to impart the textural attribute of a pocket in the crust as the crust rises. Upon baking or increased temperature, the fat melts and deposits at the bottom of the pocket or melts into the crumb grain. The preferred hard fat chips are palm chips, which are used in place of the trans-fat-containing, partially hydrogenated soy chips.

Unexpectedly, the tapioca pearls or starch agglomerates with an average particle size range of about 600 microns to about 2000 microns, and more preferably about 700 microns to about 900 microns can replace up to about 25% of the hard fat chips in a pizza crust or other flat bread without significantly affecting textural and other organoleptic properties. Although not wishing to be limited by theory, the tapioca pearls or other starch agglomerates survive the mixing, forming, and proofing without gelatinizing and remain substantially intact. The tapioca pearls or other starch agglomerates will then hydrate and gelatinize during the baking step to yield a soft and palatable pizza crust or flat bread that is similar or indistinguishable from the full-fat counterpart. Therefore, the present invention allows a significant reduction in caloric content from hard fats, fat content, and trans-fat content. Generally, a reduction of at least about 14% in caloric content from hard fat, at least about 25% in hard fat content, and at least about 100% in trans-fat content as compared to the corresponding conventional flat bread prepared without partial replacement of the hard fat chips with the starch-based particulate fat mimetic used in this invention. For comparative purposes, conventional flat bread dough would normally contain, in baker's percentages, about 2.5% to about 4% hard fat.

The texturizing agent provides tenderness to the crumb grain and crispiness to the surface of the reduced-fat flat bread. Modified potato starch is an example of a texturizing agent.

The release agent is a processing aid that aids in releasing the dough from the mixer and the dough troughs. The release agent of the present invention is preferably selected from the group consisting of soybean oil, mineral oil, lard, and the like, and combinations thereof. More preferably, the release agent is soy bean oil.

In the preferred embodiment, this invention also relates to a reduced-fat flat bread prepared from a dough, said dough comprising, in baker's percentages, about 100% flour, about 0.5% to about 15% sugar (preferably about 0.5% to about 10%), about 5% to about 10% cornmeal (preferably about 5% to about 10%), about 0.5% to about 4% salt (preferably about 1% to about 3%), about 50% to about 65% water (preferably about 55% to about 60%), about 2% to about 10% soybean oil (preferably about 4% to about 6%), about 0% to about 2% hard fat chips (preferably about 1% to about 2%) an effective amount of a starch-based particulate fat mimetic to reduce the hard fat content of the reduced-fat flat bread by at least about 25%, about 0.5% to about 4% compressed yeast (preferably about 1.5% to about 3%), an effective amount of modified potato starch to provide tenderness to the crumb grain and crispiness to the surface of the reduced-fat flat bread, about 0.1% to about 0.8% of a flavoring agent (preferably about 0.5% to about 0.7%), and about 0.2% to about 0.3% of a release agent (preferably about a 0.22% to about 0.28%), wherein the starch-based particulate fat mimetic has an average particle size of about 600 microns to about 2000 microns and wherein the starch-based particulate fat mimetic has a gelatinization temperature of about 60° C. to about 80° C.

In the more preferred embodiment, this invention also relates to a reduced-fat pizza crust prepared from a dough, said dough comprising, in baker's percentages, about 100% flour, about 0.5% to about 15% sugar (preferably about 0.5% to about 10%), about 5% to about 10% cornmeal (preferably about 5% to about 10%), about 0.5% to about 4% salt (preferably about 1% to about 3%), about 50% to about 65% water (preferably about 55% to about 60%), about 2% to about 10% soybean oil (preferably about 4% to about 6%), about 0% to about 2% palm chips (preferably about 1% to about 2%), an effective amount of tapioca pearls to reduce the hard fat content of the reduced-fat pizza crust by at least about 25%, about 0.5% to about 4% compressed yeast (preferably about 1.5% to about 3%), an effective amount of a texturizing agent to provide tenderness to the crumb grain and crispiness to the surface of the reduced-fat pizza crust, about 0.1% to about 0.8% of a flavoring agent (preferably about 0.5% to about 0.7%), and about 0.2% to about 0.3% of a release agent (preferably about a 0.22% to about 0.28%), wherein the tapioca pearls have an average particle size of about 600 microns to about 2000 microns and wherein the tapioca pearls have a gelatinization temperature of about 60° C. to about 80° C.

The following example is intended to illustrate the invention and not to limit it. Unless otherwise indicated, all percentages used in the present specification are in baker's percentages. All patents and publications referred to in the present specification are hereby incorporated by reference.

EXAMPLE 1

Reduced-Fat Pizza Crust

The table below provides the ingredients in baker's percentages. The ingredients were prepared and mixed according to known methods of preparing pizza dough. The dry components were mixed together and then the liquid components were mixed in. The dough was then proofed and baked according to conventional methods. The resulting reduced-fat pizza crust was tested in an In-Home-Use-Test with 300 respondents and was preferred 52.9% versus 47.1% for the control trans-fat chip containing product. The overall caloric content remains fixed, the overall fat content is reduced slightly, but the trans-fatty acid content is reduced to zero.

| Ingredient | Baker's % |
| --- | --- |
| Wheat Flour | 100 |
| Sugar | 1.5 |
| White Corn Meal | 3.0 |
| Salt | 1.3 |
| Water | 59.0 |
| Soybean Oil | 4.9 |
| Palm Chip | 1.2 |
| Tapioca | 0.4 |
| Compressed yeast | 2.1 |
| Modified potato starch | 7.0 |
| Yellow Corn Meal | 5.0 |

What is claimed is:

1. A flat bread prepared from a dough, said dough comprising, in baker's percentages, a blend of about 100% flour, about 0.5% to about 15% sugar, about 5% to about 10% cornmeal, about 0.5% to about 4% salt, about 50% to about 65% water, about 2% to about 10% soybean oil, 0% to about 2% hard fat chips, a starch-based particulate fat mimetic, about 0.5% to about 4% compressed yeast, about 0.1% to about 0.8% of a flavoring agent, and about 0.2 to about 0.3% of a release agent, wherein the starch-based particulate fat mimetic has an average particle size of about 600 microns to about 2000 microns.

2. The flat bread of claim 1, wherein the starch-based particulate fat mimetic is selected from the group consisting of starch pearls, starch particulates, and starch agglomerates obtained from a starch source selected from the group consisting of tapioca starch, native corn starch, potato starch, and combinations thereof.

3. The flat bread of claim 1, wherein the starch-based particulate fat mimetic is tapioca pearl.

4. The flat bread of claim 1, wherein the average particle size of the starch-based particulate fat mimetic is about 600 microns to about 900 microns.

5. The flat bread of claim 2, wherein the average particle size of the starch-based particulate fat mimetic is about 600 microns to about 900 microns.

6. The flat bread of claim 3, wherein the average particle size of the starch-based particulate fat mimetic is about 600 microns to about 900 microns.

7. The flat bread of claim 1, wherein the starch-based particulate fat mimetic has a gelatinization temperature of about 60° C. to about 80° C.

8. The flat bread of claim 2, wherein the starch-based particulate fat mimetic has a gelatinization temperature of about 60° C. to about 80° C.

9. The flat bread of claim 3, wherein the starch-based particulate fat mimetic has a gelatinization temperature of about 60° C. to about 80° C.

10. The flat bread of claim 1, wherein the hard fat chips are palm chips.

11. The flat bread of claim 2, wherein the hard fat chips are palm chips.

12. The flat bread of claim 3, wherein the hard fat chips are palm chips.

13. The flat bread of claim 1, wherein the release agent is selected from the group consisting of soybean oil, mineral oil, lard, and combinations thereof.

14. The flat bread of claim 2, wherein the release agent is selected from the group of consisting of soybean oil, mineral oil, lard, and combinations thereof.

15. The flat bread of claim 3, wherein the release agent is selected from the group consisting of soybean oil, mineral oil, lard, and combinations thereof.

16. A flat bread prepared from a dough, said dough comprising, in baker's percentages, a blend of about 100% flour, about 0.5% to about 15% sugar, about 5% to about 10% cornmeal, about 0.5% to about 4% salt, about 50% to about 65% water, about 2% to about 10% soybean oil, 0% to about 2% palm chips, tapioca pearls, about 0.5% to about 4% compressed yeast, about 0.1% to about 0.8% of a flavoring agent, and about 0.2% to about 0.3% of a release agent, wherein the tapioca pearls have an average particle size of about 600 microns to about 2000 microns and wherein the tapioca pearls have a gelatinization temperature of about 60° C. to about 80° C.

17. The flat bread of claim 16, wherein the flat bread is a pizza crust.

18. The flat bread of claim 17, wherein the hard fat chips are palm chips.

* * * * *

UNITED STATES PATENT AND TRADEMARK OFFICE
CERTIFICATE OF CORRECTION

PATENT NO. : 7,629,013 B2 Page 1 of 1
APPLICATION NO. : 11/252100
DATED : December 8, 2009
INVENTOR(S) : McPherson et al.

It is certified that error appears in the above-identified patent and that said Letters Patent is hereby corrected as shown below:

- In Column 6, Line 1, delete "0.2to" and insert -- 0.2% to --.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,629,013 B2 Page 1 of 1
APPLICATION NO. : 11/252100
DATED : December 8, 2009
INVENTOR(S) : McPherson et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (629) days Delete the phrase "by 629 days" and insert -- by 1046 days --

Signed and Sealed this

Thirty-first Day of August, 2010

David J. Kappos
*Director of the United States Patent and Trademark Office*